United States Patent
Runte et al.

(10) Patent No.: US 6,905,129 B2
(45) Date of Patent: Jun. 14, 2005

(54) WISHBONE FOR AN AUTOMOTIVE SUSPENSION

(75) Inventors: Klaus Runte, Bielefeld (DE); Udo Wächter, Bielefeld (DE); Matthias Kröger, Hille (DE)

(73) Assignee: ThyssenKrupp Automotive AG, Bochum (DE)

(*) Notice: Subject to any disclaimer, the term of this patent is extended or adjusted under 35 U.S.C. 154(b) by 0 days.

(21) Appl. No.: 10/212,296

(22) Filed: Aug. 2, 2002

(65) Prior Publication Data

US 2003/0034625 A1 Feb. 20, 2003

(30) Foreign Application Priority Data

Aug. 16, 2001 (DE) .......................................... 101 40 288

(51) Int. Cl.⁷ ................................................ B60G 3/00
(52) U.S. Cl. ............................................. 280/124.134
(58) Field of Search ................... 280/124.134, 124.135, 280/124.153, 124.136, 124.138, 124.141, 124.142, 124.143, 124.15, 124.151

(56) References Cited

U.S. PATENT DOCUMENTS

| | | | | |
|---|---|---|---|---|
| 5,158,320 A | * | 10/1992 | Ando et al. | 280/124.142 |
| 5,362,090 A | * | 11/1994 | Takeuchi | 280/124.152 |
| 5,374,075 A | * | 12/1994 | Lee | 280/86.754 |
| 5,607,177 A | * | 3/1997 | Kato | 280/124.134 |
| 6,572,126 B2 | * | 6/2003 | Tunzini | 280/124.134 |
| 2002/0005621 A1 | * | 1/2002 | Christophliemke et al. | 280/124.134 |

FOREIGN PATENT DOCUMENTS

| | | | |
|---|---|---|---|
| GB | 2 205 074 A | * | 11/1988 |
| JP | 61282106 A | * | 12/1986 |
| JP | 04085121 A | * | 3/1992 |
| JP | 09169204 A | * | 6/1997 |

* cited by examiner

*Primary Examiner*—Ruth Ilan
(74) *Attorney, Agent, or Firm*—Max Fogiel

(57) ABSTRACT

A wishbone for an automotive suspension and comprising two sheet metal halves, for attaching the front wheels of a motor vehicle. The wishbone is provided with two points of articulation on the chassis, one behind the other along the direction of travel and representing a horizontal axis (5) for the wishbone (2) to tilt around. The wishbone is also provided with one point (8) of attachment for the suspension. The object is a simpler and hence more cost-effective wishbone. At least one of the points (3 & 4) of articulation is accordingly a hollow hexagonal cross-section bolt (11) comprising two halves (18 & 19) that engages a bearing housing and is an integral component of the wishbone halves (14 & 15).

11 Claims, 3 Drawing Sheets

WISHBONE FOR AN AUTOMOTIVE SUSPENSION

BACKGROUND OF THE INVENTION

The present invention concerns a wishbone for an automotive suspension and comprising two sheet-metal halves, for attaching the front wheels of a motor vehicle.

Wishbones are employed in suspensions with McPherson struts to attach front wheels to a chassis and to control their motion. Such wishbones are usually articulated to the chassis at two points, one behind the other along the direction of travel, and are provided with a single point of attachment for the actual suspension.

Wishbones in the form of a single sheet-steel module or of two sheet-steel halves are known. Wishbones of cast metal, aluminum for instance, are also known.

The points of articulation to the chassis and the point of attachment to the suspension are preferably mounted on the wishbones as separate parts. One point of articulation to the chassis can be in the form of a separate hexagonal cross-section bolt that engages a rubber-and-metal bearing housing. Such known wishbones, however, have drawbacks. They are extremely labor intensive to manufacture and must be very precise in order to comply with the tolerances of the components they are attached to.

SUMMARY OF THE INVENTION

The object of the present invention is a wishbone of the aforesaid genus that is easier and hence cheaper to manufacture.

The advantage of the present invention is that one point of articulation can itself be part of the wishbone instead of a separate part that needs to be added to it. This approach is not only cheaper, but the absence of the joint also results in greater strength.

The embodiment illustrated in FIGS. 2 and 3 is particularly advantageous in that bending forces acting high up on the hexagonal cross-section bearing bolt can be transmitted even when the walls of the halves are not particularly thick. The advantage is lower weight, which in turn not only means greater economy but also reduces the non-resiliently supported masses of the suspension.

BRIEF DESCRIPTION OF THE DRAWINGS

One embodiment of the present invention will now be specified with reference to the accompanying drawing, wherein

FIG. 1 depicts the systems structure of a front-wheel suspension with McPherson struts. The chassis and engine are not represented.

DESCRIPTION OF THE PREFERRED EMBODIMENTS

Figure 1:
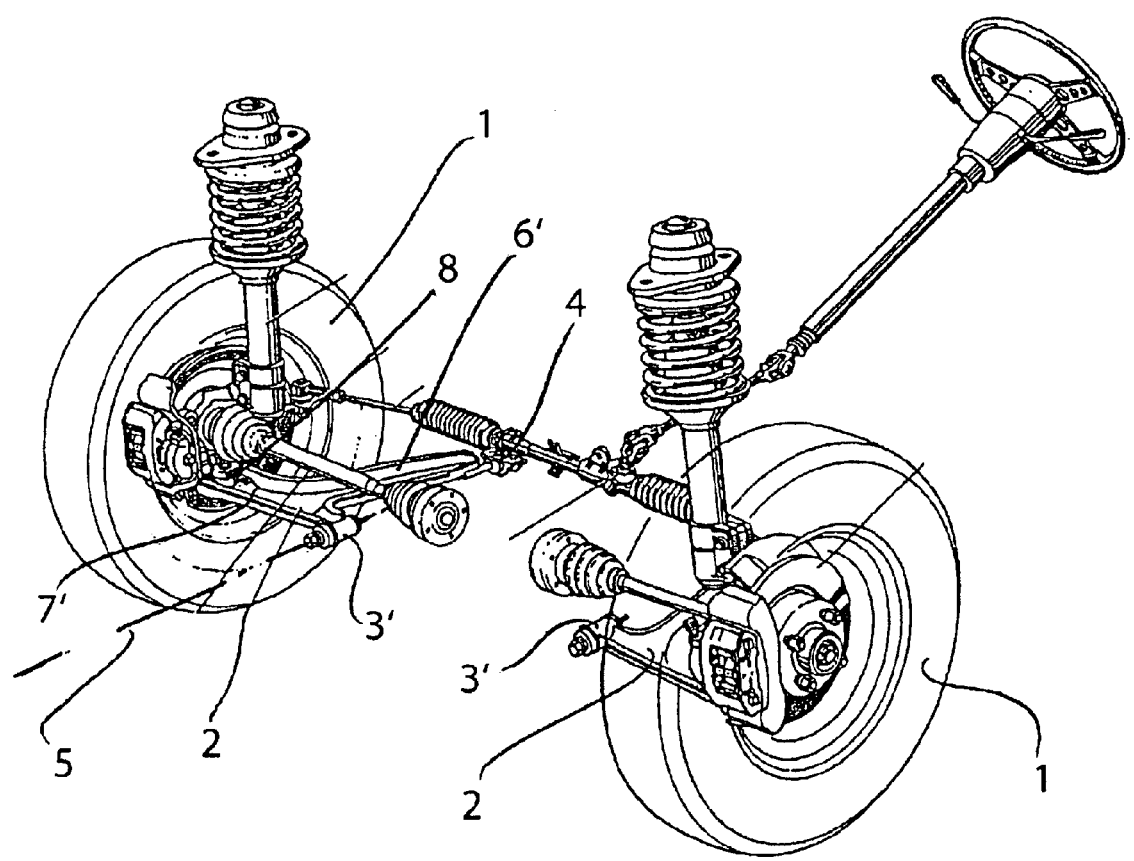
FIG. 1 is a perspective view of a front-wheel attachment.

The individually suspended wheels 1 must be allowed to move up and down while subject to horizontal control on the unillustrated chassis. This requirement is satisfied by wishbones in conjunction with other devices. Each wishbone 2 is articulated to the chassis at two points 3 and 4, one behind the other along the direction of travel. Points 3 and 4 of articulation allow wishbone 2 to tilt around an axis 5 on the chassis. Wishbone 2 is more or less flat and L-shaped, with two shanks 6 and 7. Shank 6 connects points 3 and 4 of articulation, and shank 7 supports a point 8 of attachment.

Figure 2:
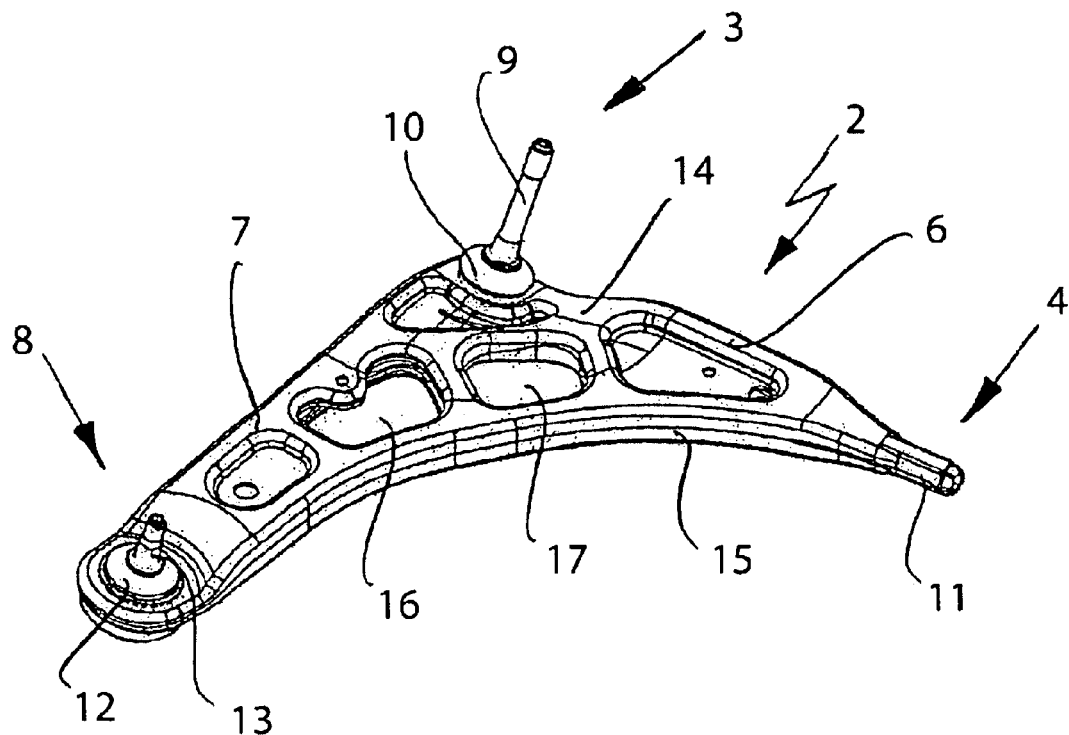
FIG. 2 is a three-dimensional view of a wishbone.

FIG. 2 depicts the wishbone 2 for the left front wheel. Front point 3 of articulation is connected to the chassis by a ball-and socket joint 10 that extends into a pin 9, preferably threaded. Rear point 4 of articulation is in the form of a finger-like hexagonal cross-section bearing bolt 11 of constant width. The suspension itself is attached at point 8 of attachment by another ball-and-socket joint 12 that also extends into a pin 13.

The body of wishbone 2 with its shanks 6 and 7 comprises two stacked halves 14 and 15 welded together at least along their outer contours and at least section to section. Since halves 14 and 15 are punched pressings, the linkage is at least to some extent hollow and provided with punched-out areas 16 and 17 along the middle to reduce weight.

Bearing bolt 11 is an integral component of the body of wishbone 2, the former's two halves 18 and 19 having been pressed out of the same sheet as body halves 14 and 15, and accordingly also hollow. To facilitate assembly, facets 20 were pressed out at the end of bearing bolt 11 while halves 14 and 15 were being manufactured.

A reinforcement 22 is accommodated along the interface 21 between halves 14 and 15 and hence between halves 18 and 19 to increase strength and rigidity. The reinforcement 22 in the illustrated embodiment is also of sheet metal, its contour matching that of bearing bolt 11 and of the adjacent area of wishbone 2. Reinforcement 22 extends approximately 1½ the length of bearing bolt 11 into the shank 6 of wishbone 2. The edges of halves 14 and 15 are recessed approximately the thickness of the reinforcement in order to provide space for it.

To connect wishbone 2 to the chassis at rear point 4 of articulation, bearing bolt 11 is inserted into an unillustrated rubber-and-metal bearing housing secured to the chassis.

Figure 3:
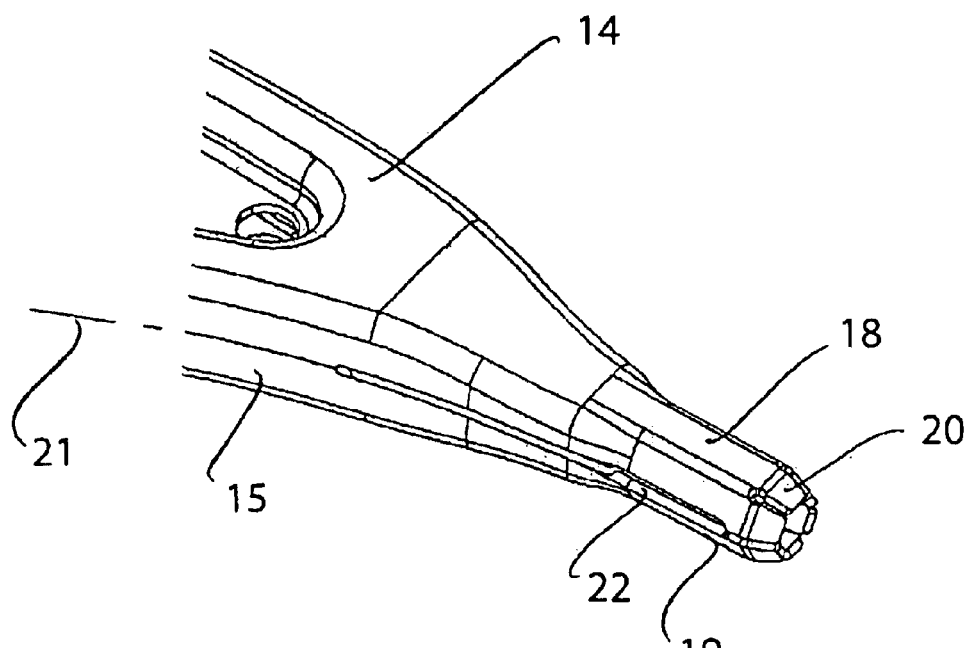
FIG. 3 is a larger-scale of the wishbone's rear point of articulation.
Figure 4:
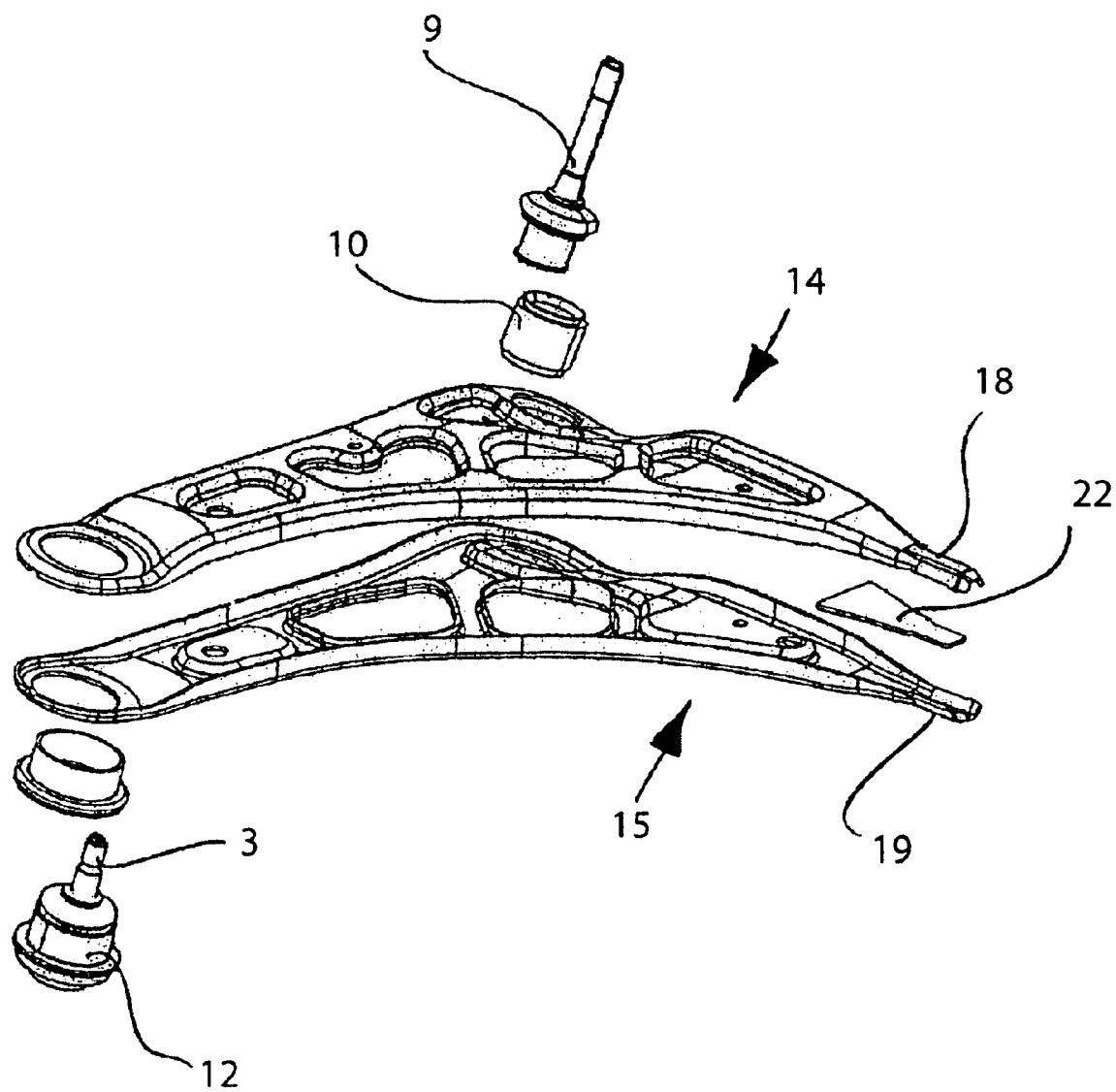
FIG. 4 is an exploded view of the wishbone prior to assembly.

FIG. 4 is an exploded view of all the components illustrated in FIGS. 2 and 3. The illustration depicts the parts before the halves 14 and 15 are welded together and to reinforcement 22.

As an alternative to welding halves 14 and 15 and reinforcement 22, they can also be cemented together. These components, that is, need not be of steel but can also be of aluminum or plastic for instance. It is also possible to fill the inside of wishbone 2 with plastic. If the insides of the wishbone and bearing bolt are injected with fiber-reinforced plastic, there will in many applications be no need for a reinforcement.

In particular applications, halves 14 and 15 can be symmetrical not only in certain areas, halves 18 and 19 for example, but also over their total extent. Such a wishbone can be employed for either the left or the right wheel.

List of Parts 1. wheel
2. wishbone
3. front point of articulation
4. rear point of articulation
5. tilting axis
6. shank
7. shank 8. point of attachment
9. pin
10. ball-and-socket joint
11. bearing bolt
12. ball-and-socket joint
13. pin
14. body half
15. body half
16. punched-out area
17. punched-out area
18. bearing-bolt half
19. bearing-bolt half
20. facet
21. interface
22. reinforcement

What is claimed is:

1. A wishbone for an automotive suspension comprising: two sheet metal halves for attaching to front wheels of a motor vehicle having a chassis with two points of articulation on the chassis, one of said points being behind the other point along a direction of travel and being a horizontal axis for the wishbone to tilt around; said wishbone having a point of attachment for the suspension; at least one of said points of articulation being a hollow hexagonal cross-section weight-saving steering bolt for connecting to said chassis and comprising two halves for engaging a bearing housing and being an integral component of said two sheet metal halves; and a reinforcement inside said bolt for providing sufficient bending and torsion resistance of said bolt; said reinforcement functioning between said halves of said bolt; said reinforcement being of sheet metal and extending along an interface between said halves of the wishbone.

2. The wishbone as defined in claim 1, wherein said reinforcement extends into the wishbone.

3. The wishbone as defined in claim 1, wherein said reinforcement fits inside said bolt.

4. The wishbone as defined in claim 1, wherein said reinforcement has a contour matching that of said bolt and, that of adjacent areas of the wishbone; said reinforcement having a thickness; at least one of two halves of said bolt and said halves of said wishbone having a recess matching the thickness of the reinforcement.

5. The wishbone as defined in claim 1, wherein said halves of the wishbone are of a material corresponding to that of the reinforcement.

6. The wishbone as defined in claim 1, wherein said halves of the wishbone and the reinforcement are of a ferrous metal.

7. The wishbone as defined in claim 1, wherein said halves of the wishbone are welded together and to the reinforcement.

8. The wishbone as defined in claim 1, wherein said halves of the wishbone are cemented together and to the reinforcement.

9. The wishbone as defined in claim 1 wherein a hollow space between said halves of the wishbone is filled with plastic.

10. The wishbone as defined in claim 1, wherein a hollow space between said halves of the wishbone and a hollow space between the two halves of said bolt is filled with plastic.

11. The wishbone as defined in claim 1, wherein said halves of the wishbone are symmetrical.

* * * * *